(12) United States Patent
Bayer et al.

(10) Patent No.: US 10,621,447 B2
(45) Date of Patent: Apr. 14, 2020

(54) METHOD FOR ESTIMATING TRAFFIC LANES

(71) Applicant: Continental Teves AG & Co. oHG, Frankfurt (DE)

(72) Inventors: Christopher Bayer, Munich (DE); Claudia Loy, Munich (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/576,097

(22) PCT Filed: May 13, 2016

(86) PCT No.: PCT/DE2016/200227
§ 371 (c)(1),
(2) Date: Nov. 21, 2017

(87) PCT Pub. No.: WO2016/188523
PCT Pub. Date: Dec. 1, 2016

(65) Prior Publication Data
US 2018/0173970 A1    Jun. 21, 2018

(30) Foreign Application Priority Data
May 22, 2015   (DE) .................. 10 2015 209 467

(51) Int. Cl.
*G06K 9/62*   (2006.01)
*G06K 9/00*   (2006.01)

(52) U.S. Cl.
CPC ......... *G06K 9/00798* (2013.01); *G06K 9/629* (2013.01)

(58) Field of Classification Search
CPC combination set(s) only.
See application file for complete search history.

(56) References Cited

U.S. PATENT DOCUMENTS 9,170,116 B1 * 10/2015 Joshi ............... G01C 21/32
2008/0065328 A1 * 3/2008 Eidehall ........... B60W 30/0956
701/301
(Continued)

FOREIGN PATENT DOCUMENTS

DE    102007044761 A1    5/2008
DE    102012219475 A1    4/2013
(Continued)

OTHER PUBLICATIONS

International Search Report and Written Opinion dated Aug. 8, 2016 of corresponding International patent application PCT/DE2016/200227.
(Continued)

*Primary Examiner* — Tsung Yin Tsai

(57) ABSTRACT

A method for estimating traffic lanes uses as input data the position and direction of feature vectors, which are measured from multiple different sensors independently of one another. A feature vector is formed by a position in the coordinate system of the ego-vehicle, which position describes a point on the border of a traffic lane, and a direction or an angle which indicates the direction in which the border of the traffic lane runs at this position. Further input data are variables which represent the quality of the measurement of the positional and the directional accuracy and the probability of the existence of a feature vector. The input data are accumulated chronologically together. The geometry of traffic lanes is estimated from the accumulated input data, taking into account the quality of the measurement. The estimated geometry of traffic lanes is output.

9 Claims, 3 Drawing Sheets

(56) References Cited

U.S. PATENT DOCUMENTS

| | | | |
|---|---|---|---|
| 2009/0067675 A1* | 3/2009 | Tan | G06K 9/00798 382/104 |
| 2010/0098290 A1* | 4/2010 | Zhang | B60W 30/00 382/100 |
| 2010/0104199 A1* | 4/2010 | Zhang | G06K 9/00798 382/199 |
| 2010/0172542 A1* | 7/2010 | Stein | G06K 9/00798 382/103 |
| 2013/0173232 A1 | 7/2013 | Meis et al. | |
| 2014/0195138 A1* | 7/2014 | Stelzig | G08G 1/0116 701/119 |
| 2014/0236445 A1 | 8/2014 | Dzuibek | |
| 2015/0149076 A1 | 5/2015 | Strauss et al. | |
| 2015/0266477 A1* | 9/2015 | Schmudderich | B60W 30/18163 701/98 |
| 2017/0068862 A1* | 3/2017 | Mueter | G06K 9/00798 |

FOREIGN PATENT DOCUMENTS

| | | |
|---|---|---|
| DE | 102013213361 A1 | 1/2014 |
| WO | 2011131165 A1 | 10/2011 |
| WO | 2014032664 A1 | 3/2014 |

OTHER PUBLICATIONS

Search Report dated Dec. 18, 2015 from corresponding German patent application No. 10 2015 209 467.7.
Rausch et al., 2012, "Autonomes Fahren auf der Autobahn—Eine Potentialstudie für zukünftige Fahrerassistenzsysteme".
Rausch et al., 2012, "Hochgenaue Fahrzeuglokalisierung und kollektives Erlemen hochgenauer digitaler Karten", AAET—Automatisierungssysteme, Assistenzsysteme und eingebettete Systeme für Transportmittel, pp. 433-456.
Albert S Huang et al: "Lane Estimation for Autonomous Vehicles using Vision and LIDAR", Feb. 1, 2010, XP055291013.
Joshi Avdhut et al: "Generation of accurate lane-level maps from coarse prior maps and lidar", Apr. 1, 2015, IEEE Intelligent Transportation Systems Magazine, USA, XP011570795, pp. 19-29.
Sio-Song Ieng et al: "A new multi-lanes detection using mutli-camera for robust vehicle location", Intelligent Vehicles Symposium, 2005, XP010833877, pp. 700-705.
Giorgio Grisetti et al: "A Tutorial on Graph-Based SLAM", IEEE Intelligent Transportation Systems Magazine, IEEE, USA, vol. 2, No. 4, Jan. 1, 2010, XP011329369, pp. 31-43.

* cited by examiner

METHOD FOR ESTIMATING TRAFFIC LANES

BACKGROUND

The invention relates to a method for estimating traffic lanes, which method is preferably used in a driver assistance system.

The development of driver assistance systems is based on the analysis and interpretation of the environment in the proximity of the vehicle by means of sensor data. In this case, the representation of the course of the traffic lane is an important component and forms the basis of known assistance systems such as "Lane Departure Warning".

A widespread approach of traffic lane detection for representing the vehicle's environment is capturing the traffic lane markers located in front of the vehicle with a camera and evaluating the captured data by means of image processing methods (usually based on contrast anal-yses).

Camera-based traffic lane detection systems are used in various driver assistance systems such as, for example, lane keeping assistants. In general, these systems recognize the lines delimiting the ego-vehicle's traffic lane based on the traffic lane markings and warn the driver of an unintentional departure from the traffic lane, for example in the event of inattention or fatigue or a microsleep.

WO 2014/032664 A1 discloses a method for determining a course of a traffic lane for a vehicle, in which structures that demarcate a space that is fit for traffic are captured by means of at least one image acquisition unit and these structures are plotted on a surroundings map. The surroundings map of the vehicle surroundings is, in the process, subdivided into a two-dimensional grid structure of cells.

WO 2011/131165 A1 discloses a method for determining the course of the road for a moving motor vehicle with at least one surroundings sensor system. In this case, the sensor data generated by the surroundings sensor system, which is aimed at the road, are evaluated in order to detect lane-relevant features. A lane model having at least one lane model parameter which determines the course of the lane is generated for the road. Continuously differentiable segments can, in the process, be used as the lane model, in particular within the framework of a clothoid road model, a circular-arc model or a spline model.

The disadvantage of such methods is that typically only data from an imaging surroundings capturing sensor are used so that, in the event of the latter failing, no information regarding the course of the lane can be ascertained.

In addition, it is disadvantageous that geometric model assumptions have to be made in order to ascertain the course of the lane from the captured image data.

DE 102013213361 A1 presents a method for tracking for a vehicle, having means for capturing the position of other vehicles, wherein the position of other vehicles is accumulated over a predetermined period of time, and areas with a high presence of vehicles are detected as a lane. To this end, data from multiple sensors, e.g. from surroundings capturing sensor systems such as radar, lidar and/or camera systems, data from vehicle-to-vehicle communication (C2C) and data based on digital road maps, can be fused.

DE 102012219475 A1 discloses a general concept of a sensor system as well as the use thereof in motor vehicles. The sensor system comprises a plurality of sensor elements that are configured such that that they capture at least to some extent different primary measured variables and/or use at least to some extent different measurement principles. The sensor system comprises a signal processing device, wherein said signal processing device is configured to evaluate the sensor signals from the sensor elements at least to some extent collectively and to rate the information quality of the sensor signals. In the process, the signal processing device provides a piece of information about the accuracy of at least one datum of a physical variable. The signal processing device is configured such that the information about the accuracy is described in at least one characteristic quantity or a set of characteristic quantities.

BRIEF SUMMARY

The object of the present invention is to indicate a method for estimating traffic lanes, which makes possible a greater availability, an increased detection range and a more robust estimation compared with the known methods.

One starting point of the invention can be seen in that, in addition to lane keeping assistance, increasingly more complex tasks for localization and positioning, and for planning a driving strategy and an appropriate trajectory for highly automated driving are making precise traffic lane estimation essential.

The continuous further development of driver assistance systems and the associated striving for autonomous driving are placing ev-er-greater demands on the detection of traffic lane information in the vehicle environment (in particular for representation within the con-text of a road model):

The reliable, robust detection of the ego-vehicle's traffic lane and a high availability of the detection rate are absolutely essential for guaranteeing the stability and reliability of the system. This is par-ticularly true in poor weather conditions (snow/fog) or when the visibility range is partially obscured (by other road users), namely situa-tions in which purely camera-based systems are stretched to their limits. Otherwise, it is not possible to produce a system, which is not permanently monitored by a driver, but which is required for highly automated driving.

It is necessary to capture the ego-vehicle's traffic lane with an increased range, in order to make higher speeds possible, for example.

In addition to the ego-vehicle's traffic lane, it is also necessary to detect adjacent traffic lanes, in order to be able to plan e.g. a lane change or an overtaking maneuver, in order to be able to observe traffic regulations such as the "obligation to drive on the right" or to be able to assign road signs to individual traffic lanes if necessary.

Failures or weaknesses of a sensor can be compensated for by using redundant information. Finally, it must be possible to guarantee traffic lane detection at any time.

A first aspect of the invention consists of not being limited to the data from a surroundings capturing sensor during the determination or estimation of the course of traffic lanes, but also processing input data from multiple sensors.

In addition to a mono camera, traffic lane markings can also be recognized based on measurement data from a second or additional camera(s), in particular from a stereo camera, a camera having a lateral or rearward detection range (as used, for example, in panoramic view or surround view systems) or even from a laterally arranged camera having a large aperture angle, or using other optical 3D sensors. The spatially resolved detection of traffic lane markings can also take place using a high-resolution 3D flash lidar or a photonic mixing device (PMD) or in a laser-based manner via the recognition of the re-flections from traffic lane markings by means of lasers.

In addition or alternatively, the course of the traffic lane can be estimated on the basis of dynamic objects—i.e. other vehicles or road users. The dynamic objects as well as their movement behaviors (in-cluding 3D position and relative speed) can be tracked by means of a beam sensor, preferably a radar sensor or a lidar sensor. In addition, information regarding traffic lanes can also be obtained from cartographic material such as, for example, from the maps of a navigation system or also from backend databases or from communication with other vehicles, wherein the position of the ego-vehicle is ascertained by means of a position detecting device (e.g.: GPS, GNSS, localization by means of landmarks). The knowledge gained from odometry data from the vehicle sensor technology also makes it possible to estimate the course of traffic lanes. The term 'odometry data' denotes data which characterize a movement of the vehicle and can, in particular, comprise vehicle sensor technology data such as measurement variables of a chassis, a drive train, steering as well as measurement variables of a navigation device of the vehicle.

A second aspect of the invention consists of processing the data supplied by a sensor, independently of the measuring methods of this sensor, wherein the quality of the individual measured values of the sensor finds its way into the estimation, however. The measured values are therefore input into the estimation as generic features.

According to the invention, the method uses multiple pieces of input data to estimate traffic lanes. The input data are the position and direction of feature vectors, which are measured from multiple different sensors independently of one another. A feature vector is formed by a position in the coordinate system of the ego-vehicle, which position describes a point on the border of a traffic lane, and a direction or an angle which indicates the direction in which the border of the traffic lane runs at this position. The angle is also referred to below as the heading (angle) and indicates the angle between the vehicle longitudinal axis and the course direction of the traffic lane border.

Further input data are variables which represent the quality of the measurement, i.e. the positional and the directional accuracy of a measurement, and the probability of the existence of a feature vector. The method has the following steps:

The input data are accumulated chronologically together in step S10.

The geometry of traffic lanes is estimated in step S20 from the accumulated input data, taking into account the quality of the measurement (positional and directional accuracy as well as probability of existence of the feature vector). The estimated geometry of traffic lanes, i.e. the result of the estimation, is output in step S30, which in turn can, in particular, be carried out generically as a position and direction of feature vectors, as a result of which the estimated course of traffic lanes is described quantitatively.

The invention therefore provides an intelligent and general method for estimating traffic lanes based on using the data from an extremely wide variety of sources of information or sensors at the level of generic features for a robust and accurate traffic lane course estimation.

The method has the following advantages:

It makes it possible to use heterogeneous sources of information, i.e. any number of sources having different measurement principles.

It makes it possible to represent the input and output data generically as the x, y position, direction or heading, variance and confidence.

Uncertainties of an input data source are compensated for by the accuracy of other input data sources. The estimation result combines and improves the input data of a source of information.

The availability and robustness of the traffic lane estimation are increased by the redundancy. Failures of sources of information do not result in a system failure, but merely in a lower confidence as well as greater positional and directional variances.

The estimation is a priori free of geometric model assumptions.

The detection range or the area in the surroundings of the vehicle, for which traffic lane estimation is effected, is increased.

The features can be extracted from various sources of information with a small amount of pre-processing (e.g. in the case of camera systems, feature vectors are extracted from the traffic lane markings, during the estimation from dynamic objects they are described on the basis of the trajectory of the dynamic objects). A very generic representation of the input and output data of the fusion module is created by means of the feature vectors.

The fusion operates independently of the measurement principles of the sources of information and free from geometric model assumptions (such as e.g. approximation of the course of the traffic lane by clothoids or splines). At the same time, the algorithm functions both for individual input sensors and for any combination of different input signals, therefore the fusion is independent of the number of sources of information used. The quality of the input and output data is represented by means of positional variances and confidence values. Various input data can therefore be captured and combined (using appropriate weighting) and the positional accuracy of the result can be recorded. In addition, the failure of one source of information only makes itself felt in the result by means of the lower confidence value (or due to an increased variance respectively) of the feature vectors, but not by means of a system crash.

In a preferred embodiment, accumulated feature vectors, which lie together, are associated in an additional step S12. Accumulated feature vectors are therefore combined as a group, if the heading angle coincides except for an insignificant amount, and they are spatially not too far apart, in particular in a coordinate of the position.

According to an advantageous further development of the invention, associated feature vectors are fused in an additional step S14. This fusion can, in particular, take place as a weighted averaging, achieving a smoothing in the main course direction.

In a preferred embodiment, based on the accumulated (and, where appropriate, associated and averaged) feature vectors, geometric model assumptions can be used during the estimation of the geometry of traffic lanes.

A GraphSLAM method can, in particular, be used in order to estimate traffic lanes. The GraphSLAM algorithm solves the so-called "full SLAM problem" (SLAM=Simultaneous Localization And Mapping) with the aid of the optimization of a sparse graph. SLAM algorithms attempt to simultaneously ("simultaneous") create a map of the surroundings ("mapping") and determine the ego-vehicle's position in the map ("localization"). In addition to the current position, the "full problem" also consists of calculating the course of previous positions. In contrast to conventional fusion algorithms such as the Kalman filter, solving the "full SLAM problem" with GraphSLAM makes it possible to subsequently revise incorrect feature associations. As a result, more robust and more precise results can be generated and output.

Input data can preferably be ascertained from traffic lane sideline marking detection, detection of objects which delimit a traffic lane and/or trajectory measurement of vehicles driving in front and/or oncoming vehicles or dynamic objects.

The traffic lane sideline marking detection can be carried out in the known way by means of a monocular monochrome or color-resolution front camera, a stereo camera or other optical 3D sensor.

Objects which spatially delimit a traffic lane can be a curb, a guardrail, post, a border development or even a vertical depression at the border of the road surface with respect to adjacent grassland or similar. These objects can, in particular, be recognized by 3D sensors or be ascertained from camera image data.

Trajectory measurement of vehicles driving in front and/or oncoming vehicles can, in particular, be performed by means of radar, lidar or a camera having vehicle object detection. A hypothetical traffic lane course can be ascertained from the trajectory measurement in that the assumption is made that the vehicle driving in front or the oncoming vehicle is being driven within a traffic lane and a plausible traffic lane width is taken as the basis. A typical lane change of another vehicle can, in the process, be detected based on the amended curve radius of the measured trajectory. The positional accuracy of this ascertainment is significantly worse than during a detection of traffic lane markings, but it is still possible by means of radar sensors, even in extremely poor visibility conditions or in the event that the traffic lane markings are completely missing.

The output estimated geometry of traffic lanes can be advantageously used within the framework of a Lane Departure Warning (LDW), a fatigue warning, lane change assistance, active lane departure pro-tection or lane keeping, lane centering, route guidance, road sign assistance (in order to ascertain the relevance of traffic lane-related road signs for the ego-vehicle), overtaking maneuver assistance, for observing traffic regulations (e.g. obligation to drive on the right, prohi-bition of overtaking by means of a solid line), emergency braking assistance, emergency steering assistance and/or autonomous vehicle guidance.

The subject of the invention is, furthermore, a device for estimating traffic lanes which is configured to carry out a method according to the invention.

BRIEF DESCRIPTION OF THE DRAWINGS

Advantageous embodiment examples of the invention are described below with reference to figures, wherein.

DETAILED DESCRIPTION

Figure 1:
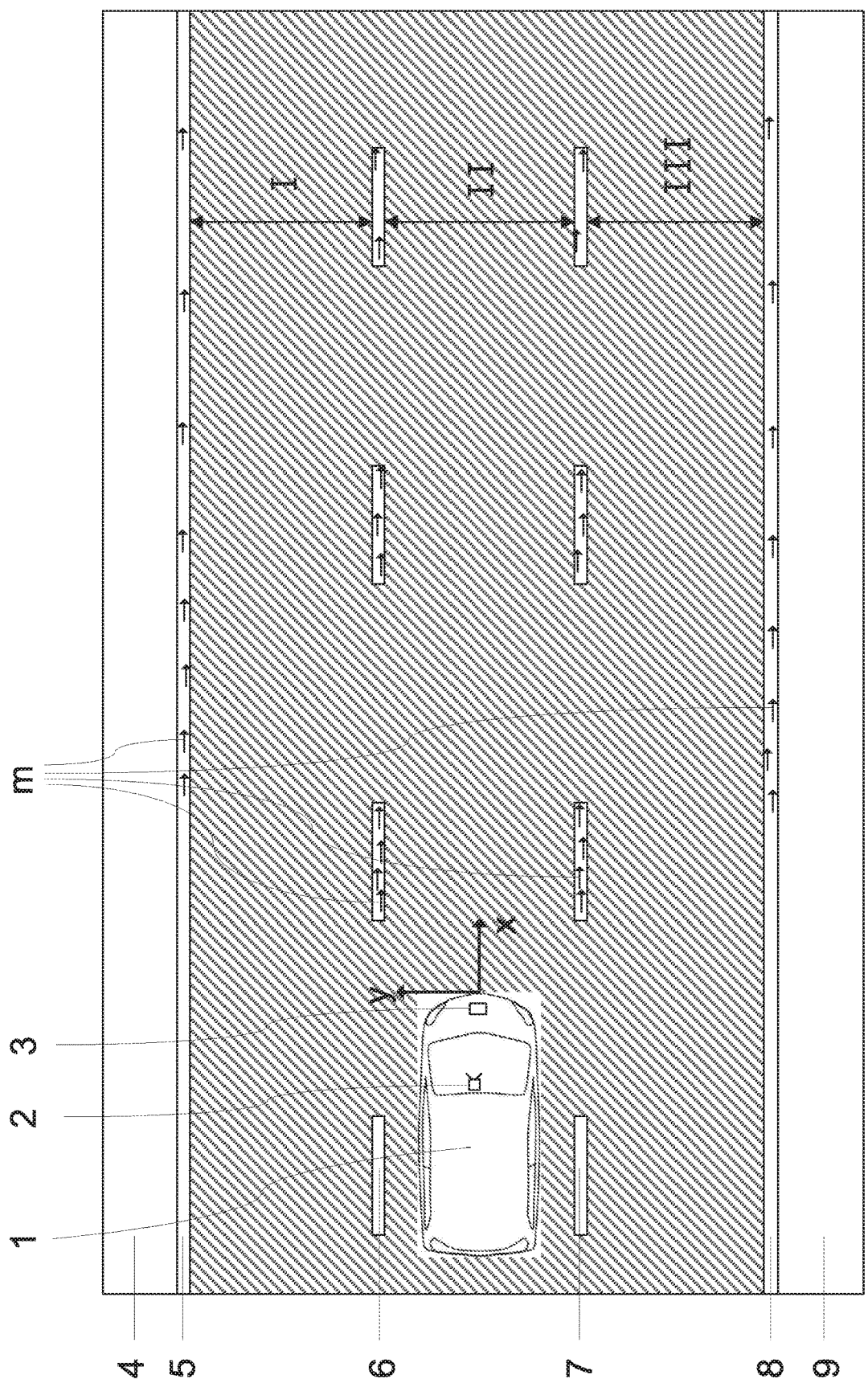
FIG. 1 shows a vehicle inside traffic lanes.

FIG. 1 shows a vehicle (1), which is located on the middle (II) of three traffic lanes (I-III). The three traffic lanes (I-III) are separated from one another by dashed traffic lane markings (6; 7) and are each separated from the adjacent area (4; 9) located outside the three-lane road by a continuous traffic lane marking (5; 8) or delimiting line.

The vehicle (1) has multiple environment capturing sensors, preferably a front camera (2) and a radar sensor (3). The front camera (2) captures images which illustrate the area of the traffic lanes (I-III) located in front of the vehicle (1), inasmuch as the road surface is located in the field of view of the front camera (2) and is not obscured by objects.

Traffic lane markings (5-8) can be extracted as bright/dark transitions from the image data in the known way. A feature can be indicated as a feature vector m (x, y, heading in vehicle coordinates) on the border of a traffic lane (I-III) or between two traffic lanes.

The x, y position and heading angle in vehicle coordinates of points, which are located in the image on the border of a traffic lane (I-III) or on a traffic lane marking (4-8), are supplied by the front camera (2) as input data for the estimating method.

In the vehicle coordinate system the x-axis corresponds to the vehicle longitudinal axis and the y axis runs perpendicular to the x-axis. Positive y-distances are therefore located on the left when viewed in the forwards direction of the vehicle. The angle of the course of the marking line or the traffic lane delimitation with respect to the vehicle longitudinal axis is referred to as the heading (angle). A heading pointing in the positive x-direction therefore means that the traffic lane marking is oriented parallel to the vehicle longitudinal axis.

Due to the limited resolution of a front camera (2) and due to uncertainties, which the traffic lane marking extraction brings with it, for example by means of a coordinate transformation, a measuring inac-curacy or variance in the position ($\sigma X$, $\sigma Y$) and the direction (aheading) is produced. Due to disruptions or restrictions during the camera image acquisition or missing, obscured, bleached out, etc. traffic lane markings, it is possible that the front camera (2) will not be able to reliably detect a traffic lane marking, or not be able to do so to some extent. This factor is also supplied as a confidence value of the respective vector. In this case, a confidence value of 1 means a 100% detection, a confidence value of 0.2 means that there is only a probability of 20% of the relevant vector m indicating a traffic lane marking (5-8) at all. Information regarding the type of traffic lane marking at this position, e.g. "solid", "dashed", "dotted" in the case of marking studs (Botts' dots), can optionally also be supplied by the front camera (2).

Therefore, one possible representation of the input and output data is as follows:

Points which describe the border of the traffic lane:

| | |
|---|---|
| x, y | [m] position in vehicle coordinates |
| Heading | [rad] heading angle in vehicle coordinates |
| $\sigma X$, $\sigma Y$, $\sigma$heading | [m, m, rad] standard deviations |
| Confidence | [0.0, 1.0] confidence values (probability of existence) |
| Type | Attributes e.g. "solid", "dashed" |

This makes it possible to use the GraphSLAM algorithm for the traffic lane course estimation:

The idea of the fusion algorithm is to describe the map ("map") generically by means of features (x, y, heading), which represent the course of the traffic lane. These features are described in the ego-vehicle coordinate system, for which the ego-vehicle's position also has to be estimated.

Generic features, which describe the probable positions of vectors, are used as input data. The position uncertainty is described by the position variance. Thanks to the general representation, the algorithm is independent of specific sensors.

The uncertainty of existence due to e.g. camera systems incorrectly recognizing objects or misinterpretations during the recognition of dynamic objects is represented by the confidence value.

Due to the solution of the "full SLAM problem" with GraphSLAM (unlike conventional fusion algorithms such as the Kalman filter), incorrect associations of feature (vector)(s) can subsequently be revised in order to therefore produce more robust and more precise results.

Thanks to the generic outcome (or the generic output) as a quantity of features points, the algorithm is free of assumptions regarding the lane representation or geometric restrictions.

Figure 2:
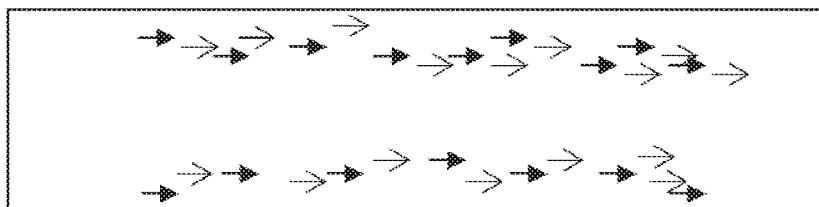
FIG. 2 shows a representation of input data of two different sensors, which have been accumulated chronologically together.
Figure 3:
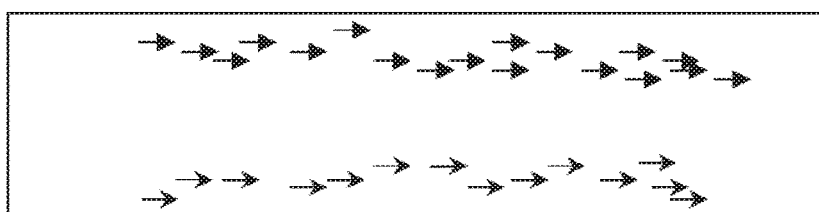
FIG. 3 shows a representation, in which input data lying together from FIG. 2 have been associated.
Figure 4:
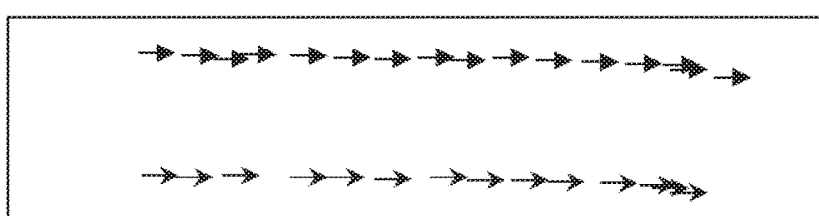
FIG. 4 shows a representation, in which the vectors associated in ac-cordance with FIG. 3 have been fused.

FIG. 2 to 4 illustrate an embodiment of the method for estimating traffic lanes.

FIG. 2 shows the position and direction of feature vectors m (sensor 1) of a first sensor (closed arrowhead) and feature vectors m (sensor 2) of a second sensor (open arrowhead). The features of various input sources are accumulated chronologically together, i.e. are in particular ascertained together at one time and plotted in the same x-y graph, as shown by way of example in FIG. 2.

FIG. 3 shows how features which lie together are associated, as they probably belong to the same traffic lane border. Feature vectors which lie together are those where the heading angle substantially coincides and the position of which is not too far apart from one another. FIG. 3 clearly shows an upper group (a1) and a lower group (a2) of feature vectors, each of which already almost form a line.

In the case of dashed lines which are recognized by the front camera and run in the x-direction, jumps occasionally occur in the x-position between two neighboring feature vectors during scanning, but the y-position should not have any serious jumps (not shown).

FIG. 4 shows how the features associated in FIG. 3 are fused, as a result of which, in particular, the positional accuracy is improved and the confidence is increased in the case of the upper group (f1) and the lower group (f2). The fusion can take place in the form of a weighted averaging of the y-positions, as a result of which anomalies can be removed. The weighting can, firstly, take account of the measuring uncertainty of the position determination and, on the other hand, of the probability of existence.

Figure 5:
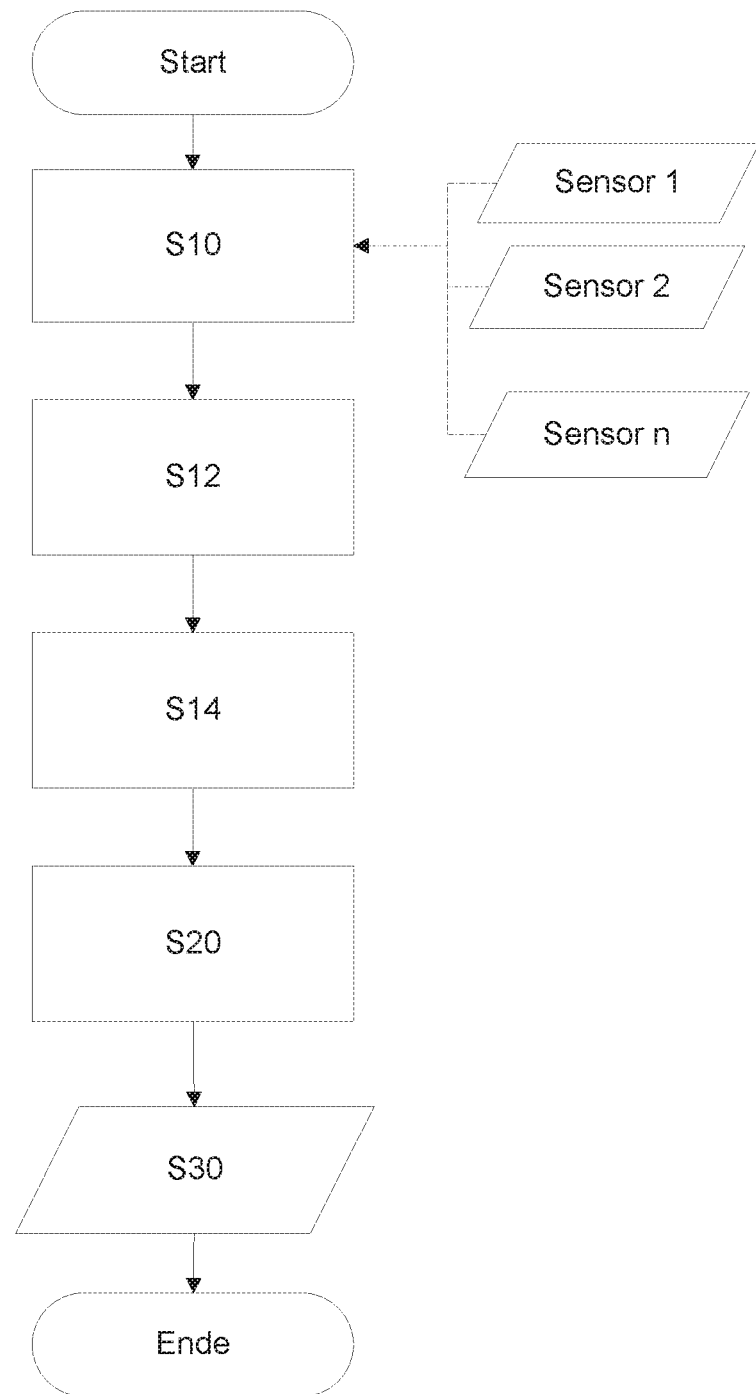
FIG. 5 shows a schematic flow diagram regarding the sequence of a method for estimating traffic lanes.

FIG. 5 schematically shows a sequence of one embodiment of the method for estimating traffic lanes.

In step S10, input data from multiple sensors (sensor 1 to sensor n) are accumulated chronologically together as feature vectors.

Features which lie together are associated in step S12.

The associated features are fused in step S14.

In step S20, the geometry of traffic lanes is estimated. This can be done in that the result of the fusion is adopted as an estimation result. If no fusion has been carried out, the result can be estimated on the basis of the association of feature vectors.

If no association has taken place either, the estimation result can then be directly obtained from the accumulated input data, taking into account the quality of the measurement of the positional and directional accuracy as well as the probability of existence of the feature vector, and the geometry of traffic lanes can be obtained. A matching of the feature vectors obtained with geometric models can optionally be carried out following the fusion, association or accumulation.

In step S30, the estimated geometry of traffic lanes is output.

One possible mathematical formulation of a method according to the invention is indicated below.

One lane feature can be indicated as a feature vector $f_i$ $$f_i = [x_i, y_i, \theta_i, c_i, \Sigma_i] \quad (1)$$

wherein $x_i$ and $y_i$ indicate the position of the feature and $\theta_i$ the heading angle. The measuring uncertainty for each feature is indicated by a confidence value $c_i$ and a covariance matrix $\Sigma_i$ with respect to x, y and $\theta$. This two-dimensional formulation neglects the height information of the road course.

The aim of the algorithm for fusing the lane features is to obtain a description of the surroundings in the form of a set $F_{fl}$ of lane features $F_1, F_2, \ldots, F_N$, which is produced from the different lane feature input data. Generally, this problem can be described as an estimation of an a posteriori probability $$p(x_t, m | l_{1:t}, u_{1:t}), \quad (2)$$

wherein $x_t$ is the current vehicle pose and m is a description of the surroundings by numerous measurements $z_{1:t}$. The control vectors $u_{1:t}$ describe the movement of the vehicle at the appropriate time. This is known as a SLAM problem which can be solved e.g. by a Kalman filter or particle filter. The GraphSLAM algorithm, which describes the surroundings and not only the current vehicle position $x_t$ but also the entire trajectory $x_{0:t}$, is used in the present case.

In GraphSLAM, equation (2) is described as a sparse graph. The vehicle poses $x_{0:t}$ and the surroundings m are described as vertices (nodes) $v_i \in V$. The measurements and control vectors describe mandatory conditions, which connect the relevant vertices as edges. An edge therefore contains information about the border of a lane. The graph is formulated as the sum of the conditions $$J(V) = \sum_{z_{i,j}} e(z_{ij}, v_i, v_j)^T \Omega_{ij} e(z_{i,j}, v_i, v_j), \quad (3)$$

wherein $e(z_i, v_i, v_j)$ is an error function. This error function indicates the discrepancy between the measurements $z_i$ and the vertex pose difference $\hat{z}_i$ ($v_i$, $v_j$). This discrepancy is weighted with the measurement covariance in the form of information matrices $\Omega_i = \Sigma_i^{-1}$. The minimization of this sum of non-linear quadratic equations can be solved by the Gauss-Newton algorithm. The resulting configuration of the vertices $V^* = \arg\min J(V)$ is equal to the poses of the estimated surroundings features and the vehicle pose.

The graph can be structured as follows. The surroundings and the measured lane features are represented as nodes in the graph $G_t$. Since only the surroundings in front of the vehicle are of interest, the relevant set of vehicle poses is reduced to $x_{t-\tau:t}$ with $\tau-1$ poses. Therefore, the graph $G_t$ contains successive vehicle poses $x_{t-\tau}, x_{t-\tau+1}, \ldots, x_t$ and lane features $f_1, f_2, \ldots, f_n$ as vertices $v_i = [x, y, \theta]$. All of the poses of the graph vertices are indicated with respect to the current vehicle poses coordinate system. The measurement constraints, which define the edges of the graph, follow from the input lane features and the control vectors, which are described below.

The odometry is inserted into the graph as follows: the current control vectors $u_t=[\dot{\psi}, \vec{v}]^T$ are added to the previous graph $G_{t-1}$. The control vector is composed of the yaw rate $\dot{\psi}$ and the speed $\vec{v}$ of the vehicle, and is used in order to calculate the pose difference $z_{x_{t-1},x_t}=\Delta x$ between the previous pose $x_{t-1}$ and the current pose $x_t$ with the relevant information matrices $\Omega_{\Delta x}$. First of all, all of the vertices are transformed from $\times_{t-1}$ into the current vehicle pose $x_t$ using $\Delta x$. Following this transformation, all of the measurements which are located more than 5 meters behind the vehicle are removed from the graph $G_t$. Additionally, previous vehicle poses which are no longer being used are rejected. The odometry edge is inserted into the graph between two successive poses as the condition $$J_t^{odo}=e(\Delta x, x_{t-1}, x_t)^T \Omega_{\Delta x} e(\Delta x, x_{t-1}, x_t), \quad (4)$$

with the error function $$e(\Delta x, x_{t-1}, x_t)=[\Delta x - \hat{z}_{tt}(x_{t-1}, x_t)].$$

Clothoids from the traffic lane detection of an available vehicle camera (smc) are added to the graph as follows:

The clothoids are scanned as two meters in order to calculate the poses and the information matrices of the features $f_{t,i}^s$ in the vehicle coordinate system. These features are associated with all the existing lane features of the graph. If no feature is found within an association distance, a new vertex is added to the graph. The condition is described as $$J_{t,i}^{smc}=e(f_{t,i}^{smc}, x_t, f^*)^T \Omega^{smc} e(f_{t,i}^{smc}, x_t, f^*), \quad (5)$$

where the measurement $f_{t,i}^s$ is the desired pose difference between the vertex of the current vehicle pose $x_t$ and the vertex of the new or associated feature f*. This produces the smc edges.

Features from a high-resolution camera (hrc) are inserted into the graph as follows: since features in images of the high-resolution camera are directly extracted in the case of the lane markings, the relevant features $f_{t,i}^h$ in vehicle coordinates are directly associated with existing features or inserted as a new vertex with the relevant measurement constraints $$J_{t,i}^{hrc}=e(f_{t,i}^{hrc}, x_t, f^*)^T \Omega^{hrc} e(f_{t,i}^{hrc}, x_t, f^*), \quad (6)$$

resulting in the edges for the high-resolution camera data.

Feature from dynamic objects are added to the graph as follows: the idea is to use the positions and movements of other road users in order to derive information about the lanes from this. In the majority of cases, drivers of other vehicles tend to drive in the proximity of the middle of the lane. Features are generated from tracked objects on the basis of this assumption. Two features perpendicular to the direction of travel of the object are created on the left and right side of each dynamic object with a distance of w/2 as potential lane markings. The parameter w is an estimation of the current lane width, which can either be adopted from the clothoids from the traffic lane detection of the available vehicle camera, or for which 3.5 meters can otherwise be assumed. The latter corresponds to the usual width of a lane on motorways in Germany.

The corresponding feature covariances are equal to the sum of the object covariances and of a covariance matrix, which indicates the lateral standard deviation of road users with respect to the lane cen-ter. The resulting features are associated with existing features or added as a new vertex with the measurement constraints $$J_{t,i,l/r}^{obj}=e(f_{t,i,l/r}^{obj}, x_t, f^*)^T \Omega^{obj} e(f_{t,i,l/r}^{obj}, x_t, f^*), \quad (7)$$

wherein $f_{t,i,l/r}^o$ is the left or right feature of the i-th tracked object at time t.

One potential shortcoming of the model is that the left and right features are decoupled, which means that an improvement in the position of the left feature does not influence the right feature and vice versa. Therefore, the assumption of the lane width is expressed as a constraint between the left and right feature:

$$J_{t,i}^{width}=e(w, f_{t,i,l}^{obj}, f_{t,i,r}^{obj})^T \Omega^{width} e(w, f_{t,i,l}^{obj}, f_{t,i,r}^{obj}). \quad (8)$$

The desired pose difference between the left and the right feature of the same object is defined as w=[0, w, 0°] with the lane width was the lateral distance. The angle difference is set to zero, since the movement direction of the two features should be the same. The information matrix $\Psi_{w,h}$ corresponds to the variance of the current lane width estimation.

In addition, an additional dependency should be observed: in the current model two successive features are decoupled on the same side of an object. This means that $f_{t-1,i,l}^o$ does not have a direct influence on $f_{t,i,l}^o$. If a feature $f_{t-1,i,l}^o$ is corrected by other measurements, a large discrepancy can occur with respect to the subsequent feature. This discrepancy should be minimized by introducing a smoothing condition $$J_{t,i,l}^{smo}=e(0, f_{t-1,l}^{obj}, f_{t,l}^{obj})^T \Omega^{smo} e(0, f_{t-1,l}^{obj}, f_{t,l}^{obj}) \quad (9)$$

between the two features. The lateral displacement between two successive features can then be reduced by increasing fly and. Since the distance in the longitudinal direction is not to be altered, the following applies $\Omega_x^s=0$. In this case, this produces an edge for one side for each object.

If road users perform a lane change, this condition is seriously violated since, as of a particular point, the feature $f_{t-1,i}^o$ belongs to one lane and the feature $f_{t,i}^o$ belongs to the other lane. In this case, with GraphSLAM, the equation (9) can be multiplied by a switching variable $0 \le s_{t,i,l/r} \le 1$. If this variable is set to zero, this edge is deactivated and if it equals one, the edge is fully activated. This can be applied during the optimization of GraphSLAM, in order to avoid false correlations by inserting $J_{t,i,l/r}^s=\Omega^s(1-s_{t,i,l/r})^2$ as a further condition. This forces the edge to be activated until such time as the error of the edge becomes too large, and the deactivation of the edge leads to better results.

Solving of the Graph: Taken Together, the Graph $G_t$ Comprises the Conditions $$J(v) = \sum_t J_t^{odo} + \sum_t \sum_i J_{t,i}^{smo} + \sum_t \sum_i J_{t,i}^{hdo} + \quad (10)$$
$$\sum_t \sum_i (J_{t,i,l/r}^{obj} + J_{t,i}^{width} + s_{t,i,l/r} J_{t,i,l/r}^{smo} + J_{t,i,l/r}^s),$$

wherein t runs across all τ−1 relevant time steps and i across all sensor features of the relevant time step.

A configuration of optimum vertex poses is obtained by solving the graph. The result of the algorithm corresponds to a set $F_{fl}$ of fused lane features, which correspond directly to the optimum vertex poses. The confidence values of the resulting fused features are updated each time that measured features are associated.

A real-time capable application of the fusion algorithm was implemented in order to demonstrate the feasibility of a method according to the invention on the basis of camera-based traffic lane detection and the estimation of the course of the traffic lane based on dynamic objects.

In this case, the input data were:
Traffic lane detection of an available vehicle camera (features from scanned clothoids)
Traffic lane detection on a high-resolution camera
Traffic lane estimation on the basis of dynamic objects In this setup, the robustness and the good positional accuracy of the lane detection of the ego-vehicle's traffic lane of the available vehicle camera is, on the one hand, combined with the extended traffic lane detection of the high-resolution camera (increased range, recognition of the neighboring lanes). The positional accuracy of the result is represented by means of the variances of the features. On the other hand, the camera-based traffic lane information is additionally fused with the estimation by means of dynamic objects (based on camera, radar, lidar) (advantages of the various measurement principles can therefore be combined—for example, if the camera-based traffic lane detection provides little information due to objects obscuring the visibility range). Based on the output features, geometric model assumptions can be applied (approximation of the course of the traffic lane by means of clothoids, splines, etc.)

As a result, it was possible to significantly increase the reliability of the detection of the traffic lane geometry compared with conventional detection methods.

The invention claimed is:

1. A method for estimating traffic lanes using input data, wherein the input data comprise
the position and direction of feature vectors, which are measured from multiple different sensors independently of one another, wherein the position describes a point on the border of a traffic lane and the direction indicates in which direction the border of the traffic lane runs at this position, and
variables which represent the quality of the measurement of the positional and the directional accuracy and the probability of the existence of a feature vector,
wherein the method has the following steps:
the input data are accumulated chronologically together,
the geometry of traffic lanes is estimated from the accumulated input data, taking into account the quality of the measurement of the positional and the directional accuracy as well as the probability of existence of each feature vector of the accumulated input data, and
the estimated geometry of traffic lanes is output.

2. The method according to claim 1, wherein accumulated feature vectors, which lie together, are associated in an additional step.

3. The method according to claim 2, wherein associated feature vectors are fused in an additional step.

4. The method according to claim 3, wherein, based on the accumulated, associated or fused feature vectors, geometric model assumptions are used during the estimation of the geometry of traffic lanes.

5. The method according to claim 4, wherein a GraphSLAM method is used in order to estimate traffic lanes.

6. The method according to claim 5, wherein the input data are measured by at least two of the following sensors:
monocular front camera looking in the direction of travel of a vehicle,
stereo camera looking in the direction of travel of a vehicle,
a camera having a lateral and/or rearward detection range
a camera of a panoramic view system,
other optical 3D sensor technology,
beam sensor,
vehicle sensors, or
position detecting device in conjunction with a digital map, a backend database and/or vehicle-to-vehicle communication devices.

7. The method according to claim 6, wherein the input data are ascertained from:
traffic lane sideline marking detection,
detection of objects which delimit a traffic lane,
trajectory measurement of vehicles driving in front and/or oncoming vehicles.

8. The method according to claim 7, wherein the output estimated geometry of traffic lanes is used within the framework of
lane departure warning,
fatigue warning,
lane change assistance,
active lane keeping assistance,
lane centering,
route guidance,
road sign assistance,
overtaking maneuver assistance,
assistance with observing traffic regulations,
emergency braking assistance,
emergency steering assistance, and/or
autonomous vehicle guidance.

9. A device for estimating traffic lanes comprising:
accumulating means which are configured to accumulate input data from multiple different sensors chronologically together, wherein the input data comprise:
the position and direction of feature vectors, which are measured from multiple different sensors independently of one another, wherein the position describes a point on the border of a traffic lane and the direction indicates in which direction the border of the traffic lane runs at this position, and
variables which represent the quality of the measurement of the positional and the directional accuracy as well as the probability of the existence of a feature vector,
estimating means which are configured to estimate the geometry of traffic lanes from the accumulated input data, taking into account the quality of the vectors, and
output means which are configured to output the estimated geometry of traffic lanes.

* * * * *